(12) United States Patent
Matsumoto et al.

(10) Patent No.: US 11,530,168 B2
(45) Date of Patent: Dec. 20, 2022

(54) COATING METHOD, COATING LAYER, AND TURBINE SHROUD

(71) Applicant: MITSUBISHI HEAVY INDUSTRIES AERO ENGINES, LTD., Aichi (JP)

(72) Inventors: Mineaki Matsumoto, Tokyo (JP); Takayuki Kurimura, Tokyo (JP); Azusa Tamugi, Aichi (JP); Tadayuki Hanada, Aichi (JP)

(73) Assignee: MITSUBISHI HEAVY INDUSTRIES AERO ENGINES, LTD., Aichi (JP)

( * ) Notice: Subject to any disclaimer, the term of this patent is extended or adjusted under 35 U.S.C. 154(b) by 1063 days.

(21) Appl. No.: 16/304,172

(22) PCT Filed: Aug. 1, 2017

(86) PCT No.: PCT/JP2017/027843
§ 371 (c)(1),
(2) Date: Nov. 23, 2018

(87) PCT Pub. No.: WO2018/047523
PCT Pub. Date: Mar. 15, 2018

(65) Prior Publication Data
US 2020/0283346 A1 Sep. 10, 2020

(30) Foreign Application Priority Data
Sep. 8, 2016 (JP) .............................. JP2016-175520

(51) Int. Cl.
*C04B 41/89* (2006.01)
*C04B 35/80* (2006.01)
(Continued)

(52) U.S. Cl.
CPC .............. *C04B 41/89* (2013.01); *C04B 35/80* (2013.01); *C04B 41/009* (2013.01);
(Continued)

(58) Field of Classification Search
CPC ... C04B 41/009; C04B 41/5031; C04B 41/87; C04B 41/89
See application file for complete search history.

(56) References Cited

U.S. PATENT DOCUMENTS 6,541,134 B1 * 4/2003 Strangman ............ C04B 41/009
428/323
2002/0127111 A1 9/2002 Tomita et al.
(Continued)

FOREIGN PATENT DOCUMENTS

EP 3450417 A1 3/2019
JP 07310106 A 11/1995
(Continued)

OTHER PUBLICATIONS

International Search Report and Written Opinion for International Application No. PCT/JP2017/027843 dated Sep. 12, 2017; 15pp.
(Continued)

*Primary Examiner* — Nathan H Empie
(74) *Attorney, Agent, or Firm* — Hauptman Ham, LLP (57) ABSTRACT

A coating method includes depositing a slurry including a coarsely particulate ceramic and a finely particulate ceramic on a base material configured with an oxide-based ceramics matrix composite such that a proportion of coarse particles decreases towards a surface of the base material; forming a bond coating by performing a heat treatment on the base material on which the slurry has been deposited; and forming a top coating by thermally spraying a ceramic onto the bond coating. The oxide-based ceramics matrix composite is an alumina silica type oxide-based ceramics matrix composite. The coarsely particulate ceramic and the finely particulate ceramic are alumina-based powder.

6 Claims, 4 Drawing Sheets

(51) Int. Cl.
*C04B 41/00* (2006.01)
*C04B 41/50* (2006.01)
*C04B 41/87* (2006.01)
*F01D 5/28* (2006.01)

(52) U.S. Cl.
CPC .......... *C04B 41/5031* (2013.01); *C04B 41/87* (2013.01); *F01D 5/28* (2013.01)

(56) References Cited

U.S. PATENT DOCUMENTS

| | | | |
|---|---|---|---|
| 2006/0024528 A1* | 2/2006 | Strangman | C04B 41/52 428/701 |
| 2008/0199722 A1* | 8/2008 | Apte | C23C 28/3455 428/633 |
| 2018/0037515 A1 | 2/2018 | Matsumoto et al. | |

FOREIGN PATENT DOCUMENTS

| | | | |
|---|---|---|---|
| JP | 09067662 | A | 3/1997 |
| JP | 10330958 | A | 12/1998 |
| JP | 2002266603 | A | 9/2002 |
| JP | 2008247722 | A | 10/2008 |
| WO | 2016129591 | A1 | 8/2016 |
| WO | 2018047523 | A1 | 3/2018 |

OTHER PUBLICATIONS

Canadian Office Action for International Application No. PCT/JP2017/027843 dated Dec. 13, 2019; 4pp.

* cited by examiner

| TEST CONDITION | RATIO OF COARSE PARTICLES/FINE PARTICLES | | STATUS OF BOND COATING FORMED | STATUS OF TOP COATING FORMED | DETERMINATION |
|---|---|---|---|---|---|
| | FIRST LAYER | SECOND LAYER | | | |
| EXAMPLE 1 | 7:3 | 5:5 | ○ | ○ | ○ |
| EXAMPLE 2 | 7:3 | 4:6 | ○ | ○ | ○ |
| EXAMPLE 3 | 6:4 | 5:5 | ○ | ○ | ○ |
| COMPARATIVE EXAMPLE 1 | 5:5 | NONE | △ | ○(×) | × |
| COMPARATIVE EXAMPLE 2 | 7:3 | NONE | ○ | × | × |
| COMPARATIVE EXAMPLE 3 | 7:3 | 3:7 | × | ○(×) | × |

COATING METHOD, COATING LAYER, AND TURBINE SHROUD

RELATED APPLICATIONS

The present application is a National Phase of International Application Number PCT/JP2017/027843 filed Aug. 1, 2017 and claims priority to Japanese Application Number 2016-175520 filed Sep. 8, 2016.

TECHNICAL FIELD

The present invention relates to a coating method of forming a coating layer, for example, on an inner surface of a shroud of a gas turbine, a coating layer formed by the coating method, and a turbine shroud on which the coating layer has been provided by the coating method.

BACKGROUND ART

For example, a gas turbine is used for an engine of an aircraft such as a helicopter and a jet aircraft. Such a gas turbine for aviation is configured with a compressor, a combustor, and a turbine. Therefore, the compressor compresses an air taken from an air intake port, so as to generate a compressed air having a high temperature and high pressure. Fuel is supplied in this compressed air, and the fuel is combusted by the combustor, and thus a combustion gas having a high temperature and high pressure is generated. The turbine is driven by the combustion gas. In a case of a helicopter, a rotor rotates by a driving force of the turbine. In a case of a jet aircraft, a thrust is obtained by energy of an exhaust gas.

In the gas turbine, a combustion temperature in the combustor is highly set in order to improve efficiency, and a rotor blade, a stator blade, a shroud, and the like of the turbine, which are exposed to the combustion gas (exhaust gas) having a high temperature have a thermal barrier coating (TBC) provided on surfaces thereof. In the thermal barrier coating, a top coating is provided on the surface of a base material with a bond coating interposed between the top coating and the base material. The top coating is formed by thermal spraying a thermal spraying material having small thermal conductivity.

In order to improve the efficiency of the engine of an aircraft, utilizing a material which is lightweight and excellent in heat resistance is required. Thus, applying ceramics matrix composites (CMC) exceeding characteristics of a metal-based heat resistant material has been examined. That is, a heat resistant coating layer is formed on the inner surface of a shroud produced with the CMC. In this case, the CMC and the top coating (for example, zirconia top coating) have thermal expansion coefficients different from each other. Thus, thermal stress is reduced by interposing a bond coating having an intermediate thermal expansion coefficient between the CMC and the top coating. However, if a bond coating is formed by thermal spraying an alumina coating material onto the CMC, the alumina coating material turns into an amorphous state just after the application. The alumina coating material may be crystallized at a use temperature, and cracks may occur.

As a method of forming a bond coating having high durability, a method of spraying powder slurry or performing dipping into the powder slurry and then performing sintering is provided. As such a coating method, for example, a method disclosed in PTL 1 is provided. In the coating method disclosed in PTL 1, dispersion treatment is performed on fine alumina powder with a dispersion medium and a dispersant. Then, the resultant is mixed with a coarse alumina powder, and thereby generating a coating material. The slurry of the generated coating material is applied onto the surface of a base material and then drying is performed. Then, heat treatment is performed.

CITATION LIST

Patent Literature

[PTL 1] Japanese Unexamined Patent Application Publication No. 10-330958

SUMMARY OF INVENTION

Technical Problem

In the above-described coating method in the related art, a slurry of a coating material generated by mixing fine alumina powder and coarse alumina powder is applied onto the surface of a base material and is dried. Then, heat treatment is performed. If the coarse alumina powder is mixed with the fine alumina powder, it is possible to suppress sintering shrinkage occurring in the heat treatment. However, there are problems as follows. That is, bonding between particles in a bond coating is weakened by the coarse alumina powder. When a coating material is thermally sprayed onto the surface of the bond coating, the top coating is delaminated along with the bond coating.

To solve the above-described problems, an object of the present invention is to provide a coating method, a coating layer, and a turbine shroud for improving heat resistance and adhesion.

Solution to Problem

In order to achieve the above object, according to the present invention, a coating method includes a slurry deposition step of depositing a slurry including a coarse ceramixs particle and a fine ceramixs particle on an oxide-based ceramics matrix composite such that a proportion of coarse particles decreases towards a surface of the base material, a bond coating formation step of forming a bond coating by performing a heat treatment on the base material on which the slurry has been deposited, and a top coating formation step of forming a top coating by thermal spraying a ceramic onto the bond coating.

Thus, a bond coating is formed in a manner that a slurry including a coarse ceramixs particle and a fine ceramixs particle is deposited on a base material configured with an oxide-based ceramics matrix composite, and then a heat treatment is performed. A top coating is formed by thermal spraying a ceramic onto the bond coating. At this time, in the bond coating, the slurry is deposited such that the proportion of coarse particles decreases towards the surface of the slurry. Therefore, the bond coating largely contains the coarse ceramixs particle on the base material side, and thus it is possible to relieve stress occurring by sintering shrinkage. In addition, since the coarse ceramixs particle is contained small on the top coating side, bonding between particles in the ceramic increases. Thus, hardness becomes high, and it is possible to suppress erosion when the top coating is formed. As a result, it is possible to improve heat resistance and adhesion of a coating layer.

According to the present invention, in the coating method, the slurry deposition step includes a first slurry deposition step of depositing a first slurry in which the coarse ceramixs particle and the fine ceramixs particle are mixed at a first proportion which has been set, on the base material, and a second slurry deposition step of depositing a second slurry in which the coarse ceramixs particle and the fine ceramixs particle are mixed at a second proportion having a proportion of coarse particles, which is lower than that in the first proportion, on the surface of the first slurry.

Thus, the first slurry in which the coarse ceramixs particle and the fine ceramixs particle are mixed at the first proportion is deposited on the base material, and the second slurry in which the coarse ceramixs particle and the fine ceramixs particle are mixed at the second proportion having a proportion of coarse particles, which is lower than that in the first proportion is deposited on the surface of the first slurry. Accordingly, it is possible to easily cause the proportion of coarse particles in the first bond coating on the base material side to be different from the proportion of coarse particles in the second bond coating on the top coating side. It is possible to simplify a coating production process and to reduce cost.

According to the present invention, in the coating method, the proportion of coarse particles in the first slurry is in a range of 60% to 80%, and the proportion of coarse particles in the second slurry is in a range of 40% to 60%.

Thus, the proportion of the coarse particles in each of the first bond coating and the second bond coating is set to be the optimum value. Accordingly, it is possible to relieve stress occurring by sintering shrinkage in the entirety of the bond coating. In addition, since the coarse ceramixs particle is contained small on the top coating side, bonding between particles in the ceramic increases. Thus, hardness becomes high, and it is possible to suppress erosion when the top coating is formed.

According to the present invention, in the coating method, the oxide-based ceramics matrix composite is an alumina·silica type oxide-based ceramics matrix composite, and the coarse ceramixs particle and the fine ceramixs particle are alumina-based powder.

Thus, a ceramic having a thermal expansion coefficient positioned at an intermediate position between the thermal expansion coefficients of the base material and the top coating is applied as the coating material of the bond coating, and thus it is possible to reduce an influence of thermal stress occurring in sintering.

According to the present invention, in the coating method, the oxide-based ceramics matrix composite is a pure alumina type oxide-based ceramics matrix composite, and the coarse ceramixs particle and the fine ceramixs particle are alumina-based powder and zirconia-based powder.

Thus, a ceramic having a thermal expansion coefficient positioned at an intermediate position between the thermal expansion coefficients of the base material and the top coating is applied as the coating material of the bond coating, and thus it is possible to reduce an influence of thermal stress occurring in sintering.

According to the present invention, in the coating method, the top coating is a zirconia abradable top coating.

Thus, since the zirconia abradable top coating is used as the top coating, the top coating obtains a self-wearing type impact absorbing function, and thus, when the coating layer is brought into contact with the peripheral member, it is possible to relieve an impact force by the top coating being worn, and to prevent wear or breakage of the peripheral member.

According to the present invention, a coating layer includes a bond coating obtained by sintering a coating material including a coarse ceramixs particle and a fine ceramixs particle on a base material configured with an oxide-based ceramics matrix composite such that a proportion of coarse particles decreases towards a surface of the base material, and a top coating formed by thermal spraying a ceramic onto the bond coating.

Thus, in the bond coating, since the coating material is sintered such that the proportion of coarse particles decreases towards the surface side of the slurry, the bond coating largely contains the coarse ceramixs particle on the base material side, and thus it is possible to relieve stress occurring by sintering shrinkage. In addition, since the coarse ceramixs particle is contained small on the top coating side, bonding between particles in the ceramic increases. Thus, hardness becomes high, and it is possible to suppress erosion when the top coating is formed. As a result, it is possible to improve heat resistance and adhesion of a coating layer.

According to the present invention, in the coating layer, the bond coating includes a first bond coating obtained by sintering a first coating material in which the coarse ceramixs particle and the fine ceramixs particle are mixed at a first proportion which has been preset, and a second bond coating obtained by sintering a second coating material in which the coarse ceramixs particle and the fine ceramixs particle are mixed at a second proportion having a proportion of coarse particles, which is lower than that in the first proportion, on a surface of the first bond coating.

Thus, it is possible to easily cause the proportion of coarse particles in the first bond coating on the base material side to be different from the proportion of coarse particles in the second bond coating on the top coating side. It is possible to simplify a coating production process and to reduce cost.

According to the present invention, there is provided a turbine shroud in which the coating layer is provided on the inner surface thereof.

Thus, regarding the bond coating, it is possible to relieve stress occurring by sintering shrinkage on the base material side. In addition, since bonding between particles in the ceramic increases on the top coating side, hardness becomes high, and it is possible to suppress the erosion when the top coating is formed. As a result, it is possible to improve heat resistance and adhesion of a coating layer and to improve durability of a turbine shroud.

Advantageous Effects of Invention

According to the coating method, the coating layer, and the turbine shroud of the present invention, when a bond coating and a top coating are formed on a base material configured with an oxide-based ceramics matrix composite, in the bond coating, the proportion of coarse particles of the ceramic decreases towards the surface side of a slurry. Thus, the coarse ceramixs particle is largely contained on the base material side, and it is possible to relieve stress occurring by sintering shrinkage. In addition, since the coarse ceramixs particle is contained small on the top coating side, bonding between particles in the ceramic increases, and thus hardness becomes high, and it is possible to suppress the erosion when the top coating is formed. As a result, it is possible to improve heat resistance and adhesion of a coating layer.

DESCRIPTION OF EMBODIMENTS

Hereinafter, the preferred embodiment of a coating method, a coating layer, and a turbine shroud according to the present invention will be described in detail with reference to the drawings. The present invention is not limited to the embodiment. In a case where a plurality of embodiments is provided, the invention includes an example constituted by combining the embodiments.

Figure 1:
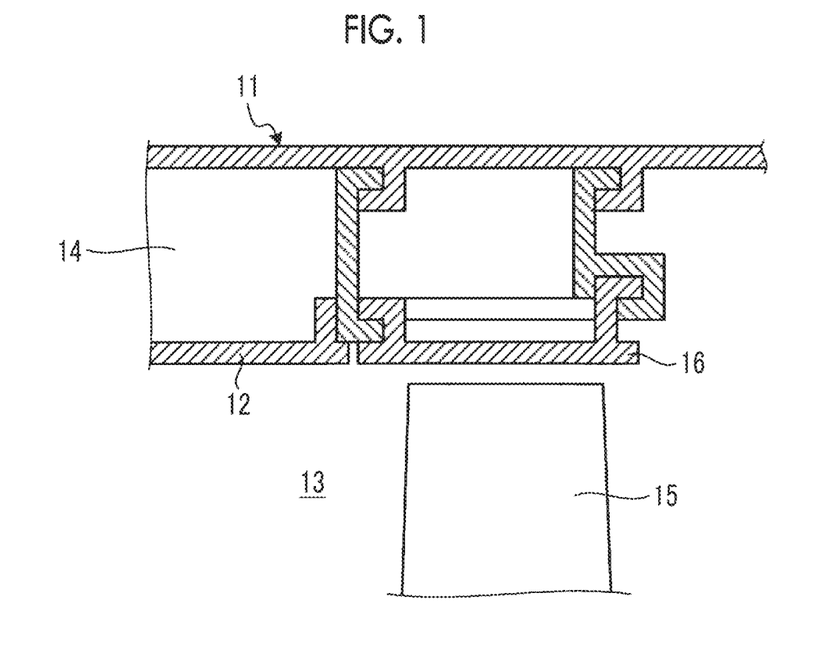
FIG. 1 is a sectional view illustrating the main part of a shroud of an aircraft engine according to an embodiment.

FIG. 1 is a sectional view illustrating the main parts of a shroud of an aircraft engine according to an embodiment.

In the embodiment, an aircraft engine as a gas turbine includes a fan casing and a body casing, and is configured in a manner that a fan is accommodated in the fan casing, and a compressor, a combustor, and a turbine are accommodated in the body casing.

The compressor includes a low-pressure compressor and a high-pressure compressor. The combustor is disposed on a downstream side of a compressor in a major direction of a compressed air. A plurality of combustors is arranged in a circumferential direction. The turbine is disposed on a downstream side of the combustor in a direction in which a combustion gas flows. The turbine includes a high-pressure turbine and a low-pressure turbine.

As illustrated in FIG. 1, the body casing 11 has an annular shape. A combustion liner 12 having an annular shape is integrally provided on the inner side of the body casing. A main flow path 13 is formed on the inner side of the combustion liner 12. An air flow path 14 for cooling is provided between the body casing 11 and the combustion liner 12. A turbine rotor 15 is disposed on the main flow path 13 formed on the inner side of the body casing 11 (combustion liner 12). The turbine rotor 15 is driven by expansion of the combustion gas from the combustor and drives with interlocking with the high-pressure compressor. A shroud 16 which is positioned on the outside of the turbine rotor (rotor blade) 15 and has an annular shape is provided in the body casing 11 and is supported by the combustion liner 12.

Figure 2:
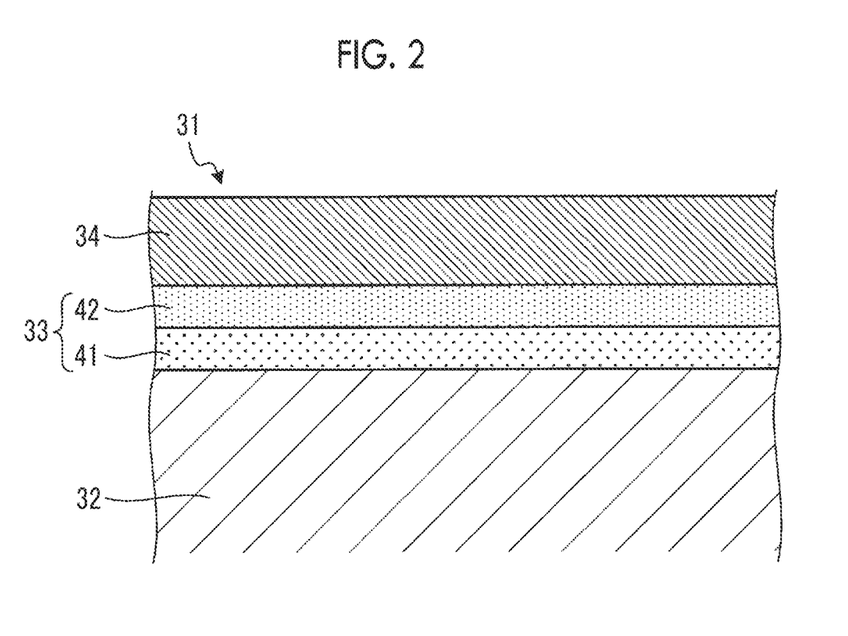
FIG. 2 is a sectional view illustrating a coating layer in the embodiment.
Figure 3:
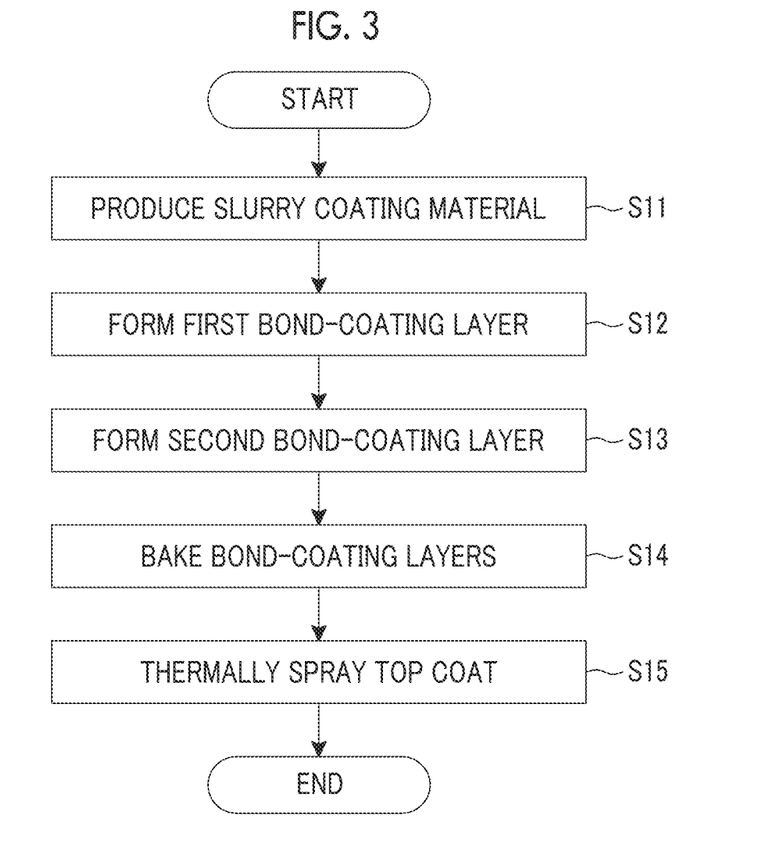
FIG. 3 is a flowchart illustrating a coating method.

FIG. 2 is a sectional view illustrating a coating layer in the embodiment. FIG. 3 is a flowchart illustrating a coating method.

As illustrated in FIG. 2, a coating layer 31 in the embodiment is configured in a manner that a bond coating 33 configured by a first bond coating 41 and a second bond coating 42 is formed on the surface of a base material 32, and a top coating 34 is formed on the surface of the bond coating 33. In the above-described aircraft engine, the base material 32 corresponds to the shroud 16 disposed on the inner side of the body casing 11. The coating layer 31 is provided on the inner circumferential surface of the shroud 16.

The base material 32 is an oxide-based ceramics matrix composite (referred to as an oxide CMC below). As the oxide CMC, an alumina•silica ($Al_2O_3$—$SiO_2$)-based oxide CMC or a pure alumina ($Al_2O_3$)-based oxide CMC is applied.

The bond coating 33 is configured by the first bond coating 41 and the second bond coating 42. The bond coating 33 is formed in a manner as follows. A slurry including a coarse ceramixs particle and a fine ceramixs particle is deposited on the base material 32 such that the proportion of coarse particles decreases towards the surface side, and the slurry is sintered by performing a heat treatment on the base material 32 on which the slurry has been deposited. In the embodiment, the bond coating 33 is formed by the two bond coatings 41 and 42 having different proportions of coarse particles.

The top coating 34 is a zirconia abradable (self-wearing type impact absorbing material) top coating. The top coating 34 is formed by thermal spraying zirconia as a ceramic onto the bond coating 33. In this case, yttria stabilized zirconia (YSZ) has been applied as thermal spray powder. In addition, for example, ytterbia stabilized zirconia (YbSZ) being zirconia ($ZrO_2$) which has been partially stabilized with ytterbium oxide ($Yb_2O_3$) may be used.

In a case where the alumina•silica-based oxide CMC is applied as the base material 32, since the thermal expansion coefficient of the alumina•silica-based oxide CMC is $6\times10^{-6}$/K, and the thermal expansion coefficient of the top coating 34 is $10\times10^{-6}$/K, alumina-based powder ($Al_2O_3$) having a thermal expansion coefficient of $8\times10^{-6}$/K positioned between the alumina•silica-based oxide CMC and the top coating is set as the coarse ceramixs particle and the fine ceramixs particle as the coating material of the bond coating 33.

In a case where the pure alumina-based oxide CMC is applied as the base material 32, since the thermal expansion coefficient of the alumina-based oxide CMC is $8\times10^{-6}$/K, and the thermal expansion coefficient of the top coating 34 is $10\times10^{-6}$/K, a mixture of alumina-based powder ($Al_2O_3$) and zirconia-based powder (YSZ), which has a thermal expansion coefficient of $9\times10^{-6}$/K positioned between the pure alumina-based oxide CMC and the top coating is set as the coarse ceramixs particle and the fine ceramixs particle as the coating material of the bond coating 33. In this case, various combinations as follows are provided, for example, a case where the alumina-based powder and the zirconia-based powder are applied as the coarse ceramixs particle and the alumina-based powder is applied as the fine ceramixs particle; a case where the zirconia-based powder is applied as the coarse ceramixs particle and the alumina-based powder is applied as the fine ceramixs particle; and a case where the alumina-based powder is applied as the coarse ceramixs particle and the alumina-based powder and the zirconia-based powder are applied as the fine ceramixs particle. Here, the volume proportion of the alumina-based powder and the zirconia-based powder is desirably 1:1.

Further, the first bond coating 41 is formed by sintering a first coating material. The first coating material is obtained by mixing the coarse ceramixs particle and the fine ceramixs particle at a first proportion which has been preset. The second bond coating 42 is formed by sintering a second coating material. The second coating material is obtained by mixing the coarse ceramixs particle and the fine ceramixs particle at a second proportion having a proportion of coarse particles, which is smaller than that in the first proportion. Therefore, the bond coating 33 is formed in a manner that the coating material including the coarse ceramixs particle and the fine ceramixs particle is sintered such that the proportion of coarse particles decreases towards the surface side. Here, regarding a relationship between the coarse ceramixs particle and the fine ceramixs particle, the particle size of the coarse ceramixs particle is equal to or greater than 5 times the particle size of the fine ceramixs particle, and is preferably equal to or greater than 7 times thereof.

That is, in a case where the bond coating 33 is formed, the slurry including the coarse ceramixs particle and the fine ceramixs particle is deposited on the base material constituted from the oxide-based CMC such that the proportion of coarse particles decreases toward the surface side. The slurry is dried, and then the heat treatment is performed on the base material 32 so as to sinter the base material.

In this case, since the bond coating 33 is configured by the first bond coating 41 and the second bond coating 42, a first slurry obtained by mixing the coarse ceramixs particle and the fine ceramixs particle at the first proportion is deposited on the base material 32. After drying the first slurry, a second slurry obtained by mixing the coarse ceramixs particle and the fine ceramixs particle at the second proportion is deposited on the surface of the first slurry. After drying the second slurry, the resultant is subjected to the heat treatment and thus is sintered.

Specifically, it is desirable that the proportion (first proportion) of coarse particles in the first slurry is in a range of 60% to 80%. It is desirable that the proportion (second proportion) of coarse particles in the second slurry is in a range of 40% to 60%.

Figure 4:
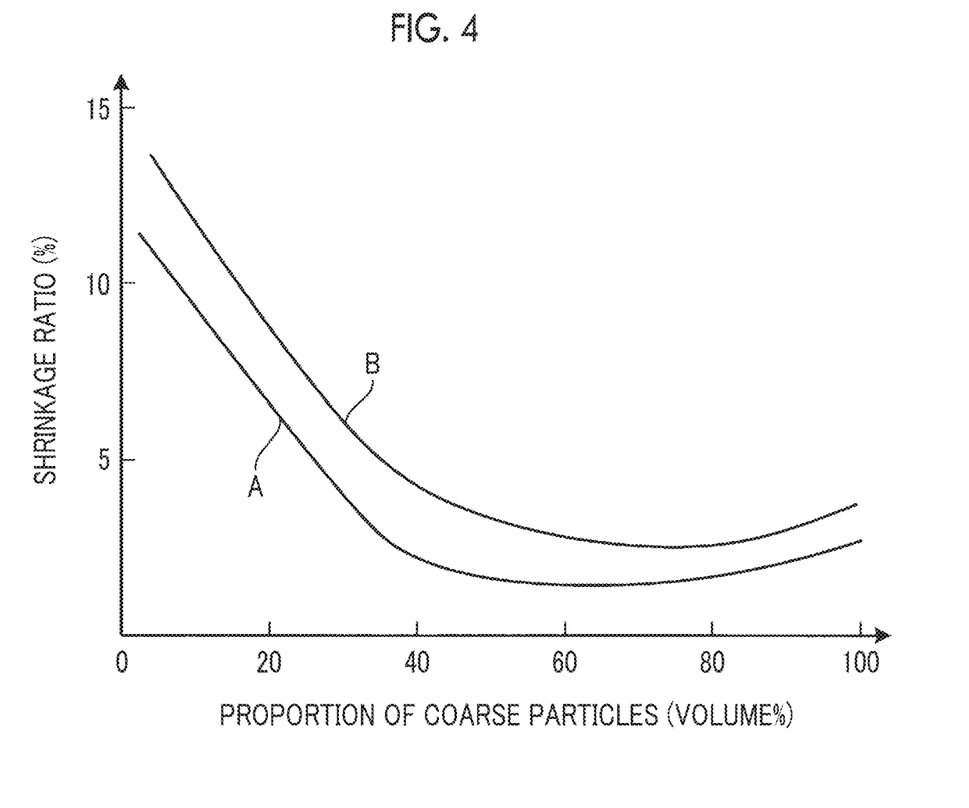
FIG. 4 is a graph illustrating a shrinkage ratio to a proportion of coarse particles of a coating material.
Figure 5:
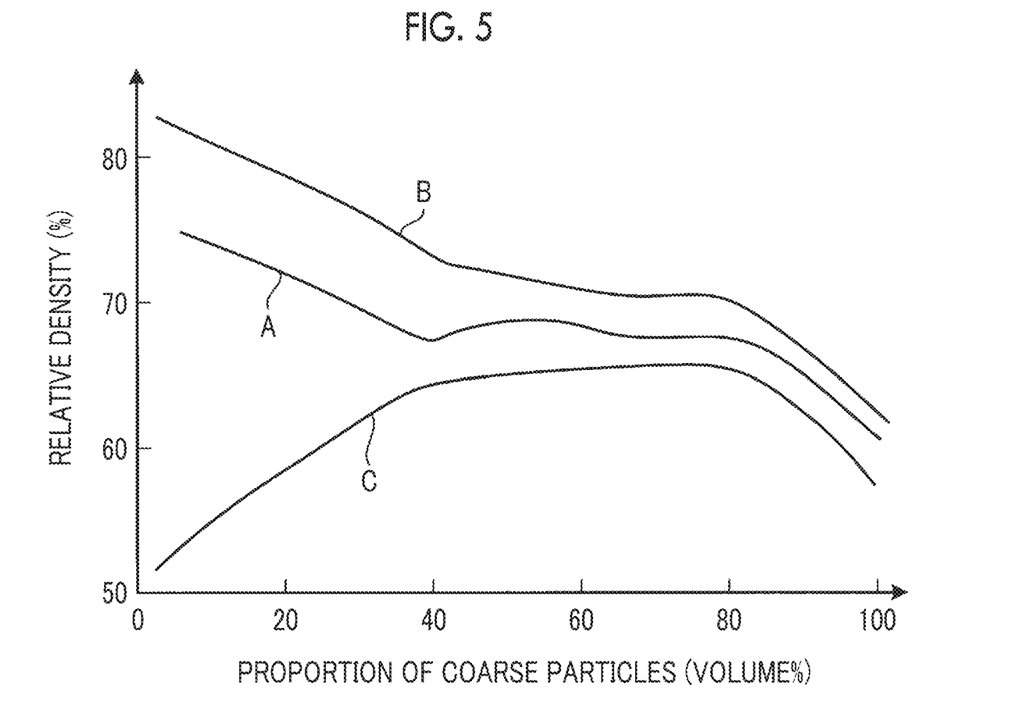
FIG. 5 is a graph illustrating relative density to the proportion of coarse particles of the coating material.

FIG. 4 is a graph illustrating a shrinkage ratio of the coating material with respect to the proportion of coarse particles. FIG. 5 is a graph illustrating relative density of the coating material with respect to the proportion of coarse particles. In FIG. 4, A indicates the shrinkage ratio in a case where the heat treatment has been performed on the coating material at 1200° C. B indicates the shrinkage ratio in a case where the heat treatment has been performed on the coating material at 1300° C. In FIG. 5, A indicates the relative density in a case where the heat treatment has been performed on the coating material at 1200° C. B indicates the relative density in a case where the heat treatment has been performed on the coating material at 1300° C. C indicates the relative density before the heat treatment is performed on the coating material. Here, the coating material is a slurry including the coarse ceramixs particle and the fine ceramixs particle. The relative density refers to a filling ratio.

As illustrated in FIG. 4, any of the shrinkage ratio A in a case where the heat treatment has been performed on the coating material at 1200° C. and the shrinkage ratio B in a case where the heat treatment has been performed on the coating material at 1300° C. shows a tendency of the shrinkage ratio decreasing if the proportion of coarse particles is high (the amount of the coarse ceramixs particle is greater than the amount of the fine ceramixs particle). Generally, in a case where a coating layer is formed by performing a heat treatment on a ceramic, it is desirable that the shrinkage ratio is equal to or smaller than 5%. It is the best that the shrinkage ratio is equal to or smaller than 3%. In this test, the shrinkage ratio was equal to or smaller than 5% when the proportion of coarse particles was in a range of being equal to or greater than 40%, and the shrinkage ratio was the smallest when the proportion of coarse particles was in a range of 50% to 80%.

As illustrated in FIG. 5, the relative density C before the heat treatment is performed on the coating material shows a tendency as follows. That is, the relative density increases if the proportion of coarse particles is high (the amount of the coarse ceramixs particle is greater than the amount of the fine ceramixs particle). The relative density decreases if the proportion of coarse particles exceeds predetermined coarse particle content. Any of the relative density A in a case where the heat treatment has been performed on the coating material at 1200° C. and the relative density B in a case where the heat treatment has been performed on the coating material at 1300° C. shows a tendency of the relative density decreasing if the proportion of coarse particles is high (the amount of the coarse ceramixs particle is greater than the amount of the fine ceramixs particle). In this test, the relative density before a heat treatment performed on the coating material and after the heat treatment had been performed was the highest when the proportion of coarse particles was in a range of 50% to 80%.

The bond coating 33 requires a coating material having a thermal expansion coefficient positioned at an intermediate position between the thermal expansion coefficient of the base material 32 and the thermal expansion coefficient of the top coating 34. The reason is that, when a coating material for forming the bond coating 33 is subjected to a heat treatment or an engine is started or stopped, relieving thermal stress occurring by a thermal expansion difference is required. Meanwhile, if the proportion of coarse particles of the ceramic is high, bonding between particles becomes weak. Thus, when the coating material is thermally sprayed onto the surface of the bond coating 33, the top coating 34 may be delaminated along with the bond coating 33.

Therefore, in the embodiment, the bond coating 33 is configured by the first bond coating 41 on the base material 32 side and the second bond coating 42 on the top coating 34 side. The proportion of coarse particles of the ceramic as the coating material in the first bond coating 41 is set to be in a range of 60% to 80%. The proportion of coarse particles of the ceramic as the coating material in the second bond coating 42 is set to be in a range of 40% to 60%. Desirably, the proportion of coarse particles of the ceramic as the coating material in the first bond coating 41 is set to be in a range of 65% to 75%. The proportion of coarse particles of the ceramic as the coating material in the second bond coating 42 is set to be in a range of 45% to 55%.

Here, the coating method according to the embodiment will be described in detail with reference to FIG. 3.

In the coating method in the embodiment, as illustrated in FIG. 3, in Step S11, a slurry coating material is produced. Specifically, alumina-based powder (average particle size 3.4 μm) as the coarse ceramics particle, agglomerated powder (average particle size 0.7 μm) as the coarse ceramics particle, and alumina-based powder (average particle size 0.16 μm) as the fine ceramics particle are used. Coarsely-particulate alumina-based powder, coarsely-particulate agglomerated powder, and finely-particulate alumina-based powder are mixed as the first slurry, at a volume ratio of 4:3:3 (proportion of coarse particles is 7:3). A nitrate (MgO) as a sintering aid is added by 500 massppm so as to set powder concentration to 25 volume %. Ball milling mixing is performed for several hours (for example, 4 hours) using distilled water as a medium. At this time, a trace amount of ammonium polycarboxlate as a dispersant is added. Coarsely-particulate alumina-based powder, coarsely-particulate agglomerated powder, and finely-particulate alumina-based powder are mixed as the second slurry, at a volume ratio of 3:2:5 (proportion of coarse particles is 5:5). A nitrate (MgO) as a sintering aid is added by 500 massppm so as to set powder concentration to 25 volume %. Ball milling mixing is performed for several hours (for example, 4 hours) using distilled water as a medium. At this time, a trace amount of ammonium polycarboxylate as a dispersant is added.

In Step S12, a first bond-coating layer (first slurry deposited) is formed. In Step S13, a second bond-coating layer (second slurry deposited) is formed. Specifically, a dip-coating device is used for slurry coating. That is, an oxide CMC serving as the base material 32 is immersed into a solution of the first slurry at a predetermined speed and is immersed for a predetermined time. Then, the oxide CMC is pulled up at a predetermined speed. Thus, the first bond-coating layer is formed on the surface of the base material 32. If the first bond-coating layer formed on the surface of the base material 32 is dried, similarly, the oxide CMC (base material 32) on which the first bond-coating layer has been formed is immersed into a solution of the second slurry at a predetermined speed, and is immersed for a predetermined time. Then, the oxide CMC is pulled up at a predetermined speed. Thus, the second bond-coating layer is formed on the surface of the first bond-coating layer. The second bond-coating layer formed on the surface of the base material 32 is dried.

If the first bond-coating layer and the second bond-coating layer are stacked on the surface of the base material 32, in Step S14, the base material 32 is put into, for example, an electric furnace. Then, a heat treatment is performed at 1200° C. for several hours (for example, 4 hours) so as to sinter the first bond-coating layer and the second bond-coating layer.

If the bond coating 33 configured by the first bond coating 41 and the second bond coating 42 is formed on the surface of the base material 32 by sintering the first bond-coating layer and the second bond-coating layer, in Step S15, a top coating is formed by thermal spraying of a plasma spray device. Specifically, a suspension obtained by mixing a solvent with thermal spray powder is supplied to a plasma spray gun. The plasma spray gun heats and accelerates the supplied suspension by using a plasma jet. The suspension turns into a molten state or a state close to the molten state, and is sprayed onto the surface of the bond coating 33 of the base material 32. Thereby, the top coating 34 is formed.

Figure 6:
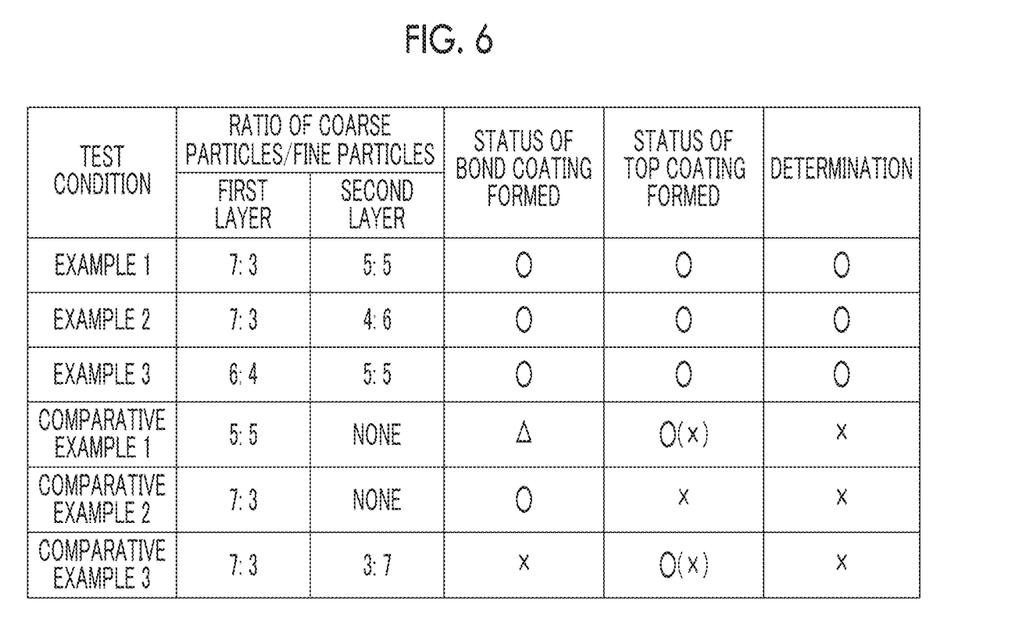
FIG. 6 is a table illustrating evaluations of examples and comparative examples regarding a bond coating.

Evaluations of the coating layer in accordance with the proportion of coarse particles or whether or not the second bond coating 42 is provided, in the first bond coating 41 and the second bond coating 42 will be described below. FIG. 6 is a table illustrating evaluations of examples and comparative examples regarding the bond coating.

As illustrated in FIG. 6, in Example 1, the first bond coating (first bond-coating layer) 41 and the second bond coating (second bond-coating layer) 42 are provided. The proportion of coarse particles in the first bond coating 41 is set to 70% (ratio of coarse particles/fine particles is 7:3), and the proportion of coarse particles in the second bond coating 42 is set to 50% (ratio of coarse particles/fine particles is 5:5). In Example 2, the first bond coating (first bond-coating layer) 41 and the second bond coating (second bond-coating layer) 42 are provided. The proportion of coarse particles in the first bond coating 41 is set to 70% (ratio of coarse particles/fine particles is 7:3), and the proportion of coarse particles in the second bond coating 42 is set to 40% (ratio of coarse particles/fine particles is 4:6). In Example 3, the first bond coating (first bond-coating layer) 41 and the second bond coating (second bond-coating layer) 42 are provided. The proportion of coarse particles in the first bond coating 41 is set to 60% (ratio of coarse particles/fine particles is 6:4), and the proportion of coarse particles in the second bond coating 42 is set to 50% (ratio of coarse particles/fine particles is 5:5).

In Comparative Example 1, the first bond coating (first bond-coating layer) is provided, and the proportion of coarse particles in the first bond coating is set to 50% (ratio of coarse particles/fine particles is 5:5). In Comparative Example 2, the first bond coating (first bond-coating layer) is provided, and the proportion of coarse particles in the first bond coating is set to 70% (ratio of coarse particles/fine particles is 7:3). In Comparative Example 3, the first bond coating (first bond-coating layer) and the second bond coating (first bond-coating layer) are provided. The proportion of coarse particles in the first bond coating is set to 70% (ratio of coarse particles/fine particles is 7:3), and the proportion of coarse particles in the second bond coating is set to 30% (ratio of coarse particles/fine particles is 3:7).

In any of Examples 1, 2, and 3, the status of the bond coating 33 being formed is good (O), and the status of the top coating 34 being formed is good (O). Thus, the determination of the coating layer 31 is good (O). In Comparative Example 1, regarding the status of the bond coating being formed, the determination (Δ) is obtained because cracks occur. Regarding the status of the top coating being formed, the status thereof has been good (O) just after the formation, but delamination (x) occurs after several days. Thus, the determination of the coating layer is also poor (x). In Comparative Example 2, the status of the bond coating being formed is good (O). However, regarding the status of the top coating being formed, delamination (x) occurs in the process of spraying. Thus, the determination of the coating layer is also poor (x). In Comparative Example 3, regarding the status of the bond coating being formed, the determination is poor (x) because large cracks occur. Regarding the status of the top coating being formed, the status thereof has been good (O) just after the formation, but delamination (x) occurs after several days. Thus, the determination of the coating layer is also poor (x).

From the evaluation results of the coating layers as described above, in the coating layer 31 in the embodiment, the bond coating 33 is configured by the first bond coating 41 on the base material 32 side and the second bond coating 42 on the top coating 34 side, the proportion (first proportion) of coarse particles of the ceramic in the first bond coating 41 is set to be in a range of 60% to 80%, and the proportion (second proportion) of coarse particles of the ceramic in the second bond coating 42 is set to be in a range of 40% to 60%. Thus, it is possible to secure favorable heat resistance and adhesion. That is, the first bond coating 41 largely contains the coarse ceramixs particle. Thus, the coarse ceramixs particle penetrates into the recessed portion of the base material 32 by vacuum impregnation, and thereby the recessed portion is adequately repaired, and stress occurring by sintering shrinkage is relieved. The amount of the coarse ceramixs particle in the second bond coating 42 is smaller than that in the first bond coating 41. Thus, bonding between particles in the ceramic increases, and thus hardness becomes high, and it is possible to suppress the erosion when the top coating 34 is formed.

As described above, the coating method in the embodiment includes a slurry deposition step of depositing a slurry including the coarse ceramixs particle and the fine ceramixs particle on the base material 32 constituted from the oxide-based CMC such that the proportion of coarse particles decreases toward the surface side, a bond coating formation step of forming the bond coating 33 by performing a heat treatment on the base material 32 on which the slurry has been deposited, and a top coating formation step of forming the top coating 34 by thermal spraying a ceramic on the bond coating 33.

Thus, regarding the bond coating 33, the slurry is deposited such that the proportion of coarse particles decreases toward the surface side of the slurry. Therefore, the coarse ceramixs particle is largely contained on the base material 32 side, and it is possible to relieve stress occurring by sintering shrinkage. Since the coarse ceramixs particle is small on the top coating 34 side, the bonding between particles in the ceramic increases, and thus hardness becomes high, and it is possible to suppress the erosion when the top coating 34 is formed. As a result, it is possible to improve heat resistance and adhesion of a coating layer.

In the coating method in the embodiment, the slurry deposition step includes a first slurry deposition step of depositing a first slurry obtained by mixing the coarse ceramixs particle and the fine ceramixs particle at the first proportion which has been preset, on the base material 32, and a second slurry deposition step of depositing a second slurry obtained by mixing the coarse ceramixs particle and the fine ceramixs particle at the second proportion having a proportion of coarse particles, which is smaller than that in the first proportion, on the surface of the first slurry. Thus, it is possible to easily cause the proportion of coarse particles in the first bond coating 41 on the base material 32 side to be different from the proportion of coarse particles in the second bond coating 42 on the top coating 34. It is possible to simplify a coating production process and to reduce cost.

In the coating method in the embodiment, the proportion of coarse particles in the first slurry is in a range of 60% to 80%, and the proportion of coarse particles in the second slurry is in a range of 40% to 60%. Thus, the proportion of the coarse particles in each of the first bond coating 41 and the second bond coating 42 is set to be the optimum value. Accordingly, it is possible to relieve stress occurring by sintering shrinkage in the entirety of the bond coating 33. In addition, bonding between particles in the ceramic increases. Thus, hardness becomes high, and it is possible to suppress the erosion when the top coating 34 is formed.

In the coating method in the embodiment, the oxide-based CMC is an alumina•silica type oxide-based ceramics matrix composite, and the coarse ceramixs particle and the fine ceramixs particle are alumina-based powder. Thus, the ceramic having a thermal expansion coefficient positioned at an intermediate position between the thermal expansion coefficients of the base material 32 and the top coating 34 is applied as the coating material of the bond coating 33. Thus, it is possible to reduce an influence of thermal stress occurring in sintering.

In the coating method in the embodiment, the oxide-based CMC is a pure alumina type oxide-based ceramics matrix composite, and the coarse ceramixs particle and the fine ceramixs particle are alumina-based powder and zirconia-based powder. Thus, the ceramic having a thermal expansion coefficient positioned at an intermediate position between the thermal expansion coefficients of the base material 32 and the top coating 34 is applied as the coating material of the bond coating 33. Thus, it is possible to reduce an influence of thermal stress occurring in sintering.

In the coating method in the embodiment, the top coating 34 is a zirconia abradable top coating. Thus, the top coating 34 obtains a self-wearing type impact absorbing function. Accordingly, when the coating layer is brought into contact with the peripheral member, it is possible to relieve an impact force by the top coating 34 being worn, and to prevent wear or breakage of the peripheral member.

The coating layer according to the embodiment includes the bond coating 33 in which the coating material including the coarse ceramixs particle and the fine ceramixs particle is sintered on the base material 32 constituted from an oxide-based CMC such that the proportion of coarse particles decreases toward the surface side, and the top coating 34 formed by thermal spraying the ceramic onto the bond coating 33. Thus, in the bond coating 33, it is possible to relieve stress occurring by sintering shrinkage on the base material 32. The bonding between particles in the ceramic increases on the top coating 34 side, and thus hardness becomes high, and it is possible to suppress the erosion when the top coating 34 is formed. As a result, it is possible to improve heat resistance and adhesion of the coating layer 31.

In the coating layer in the embodiment, the bond coating 33 includes the first bond coating 141 obtained by sintering the first coating material in which the coarse ceramixs particle and the fine ceramixs particle are mixed at the first proportion which has been preset, and the second bond coating 42 obtained by sintering the second coating material in which the coarse ceramixs particle and the fine ceramixs particle are mixed at the second proportion having a proportion of coarse particles, which is smaller than that in the first proportion, on the surface of the first bond coating 41. Thus, it is possible to easily cause the proportion of coarse particles in the first bond coating 41 on the base material 32 side to be different from the proportion of coarse particles in the second bond coating 42 on the top coating 34. It is possible to simplify a coating production process and to reduce cost.

In the turbine shroud in the embodiment, the coating layer 31 is provided on the inner surface thereof. Thus, in the bond coating 33 in the coating layer 31, it is possible to relieve stress occurring by sintering shrinkage on the base material 32. In addition, the bonding between particles in the ceramic increases on the top coating 34 side, and thus hardness becomes high and it is possible to suppress the erosion when the top coating 34 is formed. As a result, it is possible to improve heat resistance and adhesion of the coating layer 31 and to improve durability of the turbine shroud.

In the above-described embodiment, the first bond coating 41 on the base material 32 side and the second bond coating 42 on the top coating 34 side constitute the bond coating 33. The proportion of coarse particles of the ceramic in the second bond coating 42 is set to be smaller than the proportion of coarse particles of the ceramic in the first bond coating 41. However, the present invention is not limited to this configuration. For example, the number of layers in the bond coating may be set to be equal to or greater than three layers. The proportion of coarse particles of the bond coating may gradually decrease toward the top coating 34 side from the base material 32 side.

In the above-described embodiment, the base material corresponds to the turbine shroud. However, the present invention is not limited to this configuration.

The invention claimed is:

1. A coating method comprising:
    depositing a slurry including a coarsely particulate ceramic and a finely particulate ceramic on a base material configured with an oxide-based ceramics matrix composite such that a proportion of coarse particles decreases towards a surface of the slurry,
    forming a bond coating by performing a heat treatment on the base material on which the slurry has been deposited; and
    forming a top coating by thermally spraying a ceramic onto the bond coating,
    wherein the oxide-based ceramics matrix composite is an alumina silica type oxide-based ceramics matrix composite, and
    the coarsely particulate ceramic and the finely particulate ceramic are alumina-based powder,
    wherein the depositing includes depositing a first slurry in which the coarsely particulate ceramic and the finely particulate ceramic are mixed at a first proportion which has been preset, on the base material, and depositing a second slurry in which the coarsely particulate ceramic and the finely particulate ceramic are mixed at a second proportion having a proportion of coarse particles which is lower than that in the first proportion, on a surface of the first slurry.

2. The coating method according to claim 1, wherein a proportion of coarse particles in the first slurry is in a range of 60 vol % to 80 vol %, and
the proportion of coarse particles in the second slurry is in a range of 40 vol % to 60 vol %.

3. A coating method comprising:

depositing a slurry including a coarsely particulate ceramic and a finely particulate ceramic on a base material configured with an oxide-based ceramics matrix composite such that a proportion of coarse particles decreases towards a surface of the slurry, forming a bond coating by performing a heat treatment on the base material on which the slurry has been deposited; and forming a top coating by thermally spraying a ceramic onto the bond coating, wherein the oxide-based ceramics matrix composite is a pure alumina type oxide-based ceramics matrix composite, and the coarsely particulate ceramic is a mixture of alumina-based powder and zirconia-based powder and the finely particulate ceramic is a mixture of alumina-based powder and zirconia-based powder, wherein the depositing includes depositing a first slurry in which the coarsely particulate ceramic and the finely particulate ceramic are mixed at a first proportion which has been preset, on the base material, and depositing a second slurry in which the coarsely particulate ceramic and the finely particulate ceramic are mixed at a second proportion having a proportion of coarse particles which is lower than that in the first proportion, on a surface of the first slurry.

4. The coating method according to claim 3, wherein a proportion of coarse particles in the first slurry is in a range of 60 vol % to 80 vol %, and
the proportion of coarse particles in the second slurry is in a range of 40 vol % to 60 vol %.

5. A coating method comprising:

depositing a slurry including a coarsely particulate ceramic and a finely particulate ceramic on a base material configured with an oxide-based ceramics matrix composite such that a proportion of coarse particles decreases towards a surface of the slurry, forming a bond coating by performing a heat treatment on the base material on which the slurry has been deposited; and forming a top coating by thermally spraying a ceramic onto the bond coating, wherein the top coating is a zirconia abradable top coating, and wherein the depositing includes depositing a first slurry in which the coarsely particulate ceramic and the finely particulate ceramic are mixed at a first proportion which has been preset, on the base material, and depositing a second slurry in which the coarsely particulate ceramic and the finely particulate ceramic are mixed at a second proportion having a proportion of coarse particles which is lower than that in the first proportion, on a surface of the first slurry.

6. The coating method according to claim 5, wherein a proportion of coarse particles in the first slurry is in a range of 60 vol % to 80 vol %, and
the proportion of coarse particles in the second slurry is in a range of 40 vol % to 60 vol %.

\* \* \* \* \*